United States Patent [19]

Joosten

[11] Patent Number: 4,715,119

[45] Date of Patent: Dec. 29, 1987

[54] METHOD OF MANUFACTURING A PLUG

[75] Inventor: Henricus C. M. Joosten, Venlo, Netherlands

[73] Assignee: U.S. Philips Corporation, New York, N.Y.

[21] Appl. No.: 849,228

[22] Filed: Apr. 7, 1986

[30] Foreign Application Priority Data

Apr. 11, 1985 [NL] Netherlands ........................ 8501064

[51] Int. Cl.⁴ ...................... B29C 39/10; B29C 53/02; H01R 43/02

[52] U.S. Cl. ........................................ 29/858; 29/860; 29/883; 29/884; 264/261; 264/263; 264/277; 264/279.1; 264/295

[58] Field of Search ...................... 264/261, 263, 271.1, 264/279.1, 272.15, 277, 295; 350/96.23; 29/858, 883, 884, 860, 861

[56] References Cited

U.S. PATENT DOCUMENTS

| | | | |
|---|---|---|---|
| 3,534,343 | 10/1970 | Sallet | 264/261 X |
| 3,687,776 | 11/1969 | Allard et al. | 264/271.1 X |
| 3,894,900 | 7/1975 | Redmond | 264/263 X |
| 3,896,199 | 7/1975 | Michaelis | 264/261 X |
| 4,022,864 | 5/1977 | Medler | 264/263 X |
| 4,257,675 | 3/1981 | Nakagome et al. | 350/96.23 |
| 4,264,128 | 4/1981 | Young | 350/96.2 |
| 4,396,503 | 8/1983 | Schmidt | 264/261 X |

FOREIGN PATENT DOCUMENTS

| | | | |
|---|---|---|---|
| 2507648 | 2/1976 | Fed. Rep. of Germany | 350/96.23 |
| 0026840 | 2/1977 | Japan | 350/96.23 |
| 0106247 | 8/1979 | Japan | 350/96.23 |
| 0077702 | 6/1980 | Japan | 350/96.23 |
| 0124110 | 9/1980 | Japan | 350/96.23 |
| 0019026 | 11/1980 | Japan | 350/96.23 |
| 0168006 | 10/1983 | Japan | 350/96.23 |
| 1583276 | 1/1981 | United Kingdom | 350/96.23 |
| 2157018 | 10/1985 | United Kingdom | 350/96.23 |

*Primary Examiner*—Jan H. Silbaugh
*Assistant Examiner*—Leo B. Tentoni
*Attorney, Agent, or Firm*—Thomas A. Briody; Jack Oisher; William J. Streeter

[57] ABSTRACT

In accordance with the method, a supporting body (21) is formed by arranging contact members (3) so as to be adjacent and mutually parallel in a straight line and by moulding the contact members in a ribbon-like, flexible plastics body (1) while leaving contact portions (5) free. Subsequently, the body is rolled up so as to form a cylinder which is mounted in a bush (19) in order to form the supporting body (21). Prior to rolling up connection portions (7) of the contact member (3) are connected to conductors (9) of a cable (11). Finally, the assembly thus formed is enclosed by a plug body (25) which leaves the contact portions (5) free.

11 Claims, 5 Drawing Figures

1/2

METHOD OF MANUFACTURING A PLUG

The invention relates to a method of manufacturing a plug which includes at least three contact members which are arranged in a circle and which include a contact portion at a first end and a connection portion at a second end, each connection portion being electrically and mechanically connected to a conductor of a cable, the contact members being secured in a supporting body which is subsequently enclosed, together with the adjoining portion of the cable, by a plug body which leaves the contact portions free.

A plug of this kind is known from DE-A No. 2 357 999. The known plug is manufactured by securing the contact members (in this case connection pins) in a plate-shaped supporting body which is made of an insulating material, after which the conductors of the cable are soldered to the connection portions of the contact members and the supporting body is enclosed by a plug body which is formed by an injection moulding. It is difficult and time-consuming to realize reliable soldered connections at the connection side of the supporting body and special facilities are required in the form of an additional disk with chambers for accommodating the connection portions. Moreover, arranging the contact members (before or after the formation of the supporting body) in a circle is a rather time-consuming operation which is difficult to mechanize.

It is an object of the invention to improve a method of the kind set forth so that the supporting body can be manufactured in an inexpensive, quick and reliable manner. To achieve this, the method in accordance with the invention is characterized in that the supporting body is formed by arranging the contact members so as to be adjacent and mutually parallel in a straight line and by moulding the contact members in a ribbonlike, flexible plastics body while leaving the contact portions free, after which the ribbon-like body is rolled up so as to form a cylinder which is mounted in a bush, the connection portions being connected to the conductors of the cable prior to rolling up.

It is comparatively simple to arrange the contact members adjacently in a straight line and this operation can also be readily mechanized. Moreover, in many cases the contact members have been formed from a tape-like material by stamping and bending, so that they are still interconnected by strips of this material and are already situated in parallel and at equal distances from one another. The connection of the connection portions to the conductors is much simpler in said linear arrangement of the contact members than in a circular arrangement of the contact members then in a circular arrangement, because the spacing is larger and the accessibility of the connection portions is greater. Connection can be realized, for example by means of soldered connections or by folding connection tags around the conductor (so-called crimp connection). During this connection operation, thicker and thinner portions are formed, viewed along the axis of the contact member. These thicker and thinner portions are utilized in a preferred version of the method in accordance with the invention which is characterized in that prior to the moulding of the contact members in the ribbon-like body, the connection portions are connected to the conductors of the cable, said connection portions being embedded in the plastics of the ribbon-like body during the moulding operation. The thicker and thinner portions thus contribute to the anchoring of the contact members in the plastics of the ribbon-like body.

The rolling up of the ribbon-like body into a cylinder is facilitated in a further preferred version of the method in accordance with the invention which is characterized in that the ribbon-like body is formed as a thin strip of plastics on which there are provided a plurality of adjacently situated elements which have a trapezoidal cross-section, and in each of which there is embedded a contact member. During rolling up, the oblique sides of the trapezoidal elements are arranged against one another, so that a very compact cylinder is formed.

Rolling up can be further facilitated by forming a core portion at one end of the ribbon-like body and by rolling the ribbon-like body around this core portion during the rolling up operation. In the core portion there may be formed a recess having a non-circular cylindrical inner surface for cooperating with a correspondingly shaped tool. It is also possible to form the core portion around a central contact member. This offers the advantage that the plug is provided with an additional contact member. A tool can act on the central contact member during rolling up.

For the manufacture of a plug which includes a very large number of contact members, use can be made of an alternative version of the method in accordance with the invention which is characterized in that the ribbon-like body includes at least two sections with embedded contact members, each subsequent section being rolled around the preceding sections in order to form a plug having contact members arranged in a plurality of concentric circles.

The invention will be described in detail hereinafter with reference to the drawing. Therein:

Figure 1:
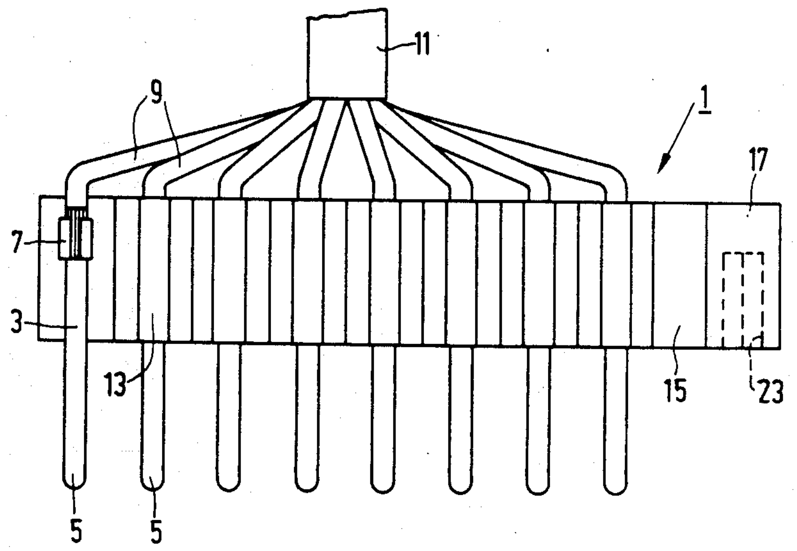
FIG. 1 is a side elevation of a ribbon-like body including contact members.
Figure 2:
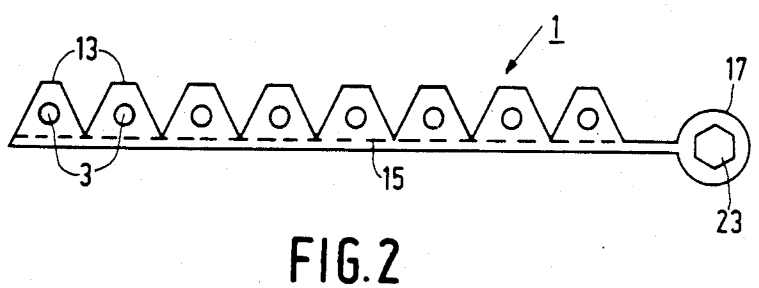
FIG. 2 is a front view of the body shown in FIG. 1.

The FIGS. 1 and 2 show a ribbon-like body 1 made, for example by casting or injection-moulding, of a soft, elastic plastics such as PVC, polyethylene or polypropylene. In the ribbon-like body 1 there are embedded contact members 3 which are provided at a first end (the lower end in FIG. 1) with a contact portion 5 and at a second end (the upper end) with a connection portion 7. Prior to the moulding of the contact members 3 in the ribbon-like body 1, each connection portion 7 is electrically and mechanically connected to a conductor 9 of the cable 11 in known manner. To this end, the connection portion 7 of the present embodiment comprises two tags which are folded around the end of the conductor 9 wherefrom the insulation has been removed. Other connection techniques such as soldering can also be used. The contact members 7 may be formed, for example from a strip of material by stamping and bending; after that operation the mutually parallel contact members will still be interconnected via intermediate portions of the strip with a fixed spacing. Thus, the conductors 9 can be readily connected; if desired, connection can also be mechanized. After connection of the conductors 9, the contact members are separated and arranged mutually in parallel in a straight line in a mould; their spacing may now deviate from the original spacing. Subsequently, the contact members 3 are moulded in the ribbon-like body 1.

During the moulding in the plastics of the ribbon-like body, each of the connection portions 7 is embedded in an element 13 having a trapezoidal cross-section, so that the slightly irregularly shaped connection portion contributes to the anchoring of the contact member 3 in the plastics. In order to make the connection portion 7 visible, the extreme left-hand element 13 has been omitted in FIG. 1. The trapezoidal elements 13 which are adjacently arranged in one line are interconnected by means of a thin strip of plastics 15 which is formed in one operation together with the elements. For the sake of clarity, the boundary between the strip 15 and the elements 13 is denoted by a broken line in FIG. 2.

In the present embodiment the contact portions 5 are shaped as contact pins which project from the plastics of the ribbon-like body 1. It will be apparent that it is alternatively possible to use socket-shaped contact members whose internal surface forms the contact portion. These socket-shaped contact members are then preferably embedded substantially completely in the plastics, so that only their openings are accessible from the outside.

Figure 3:
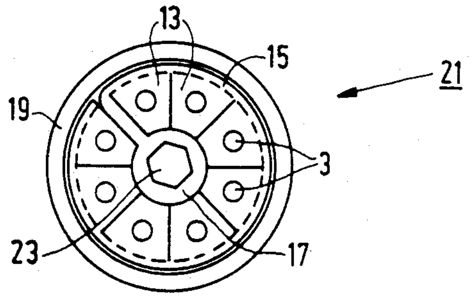
FIG. 3 is a front view of the body shown in the FIGS. 1 and 2, after rolling up and mounting in a bush.

At one end of the ribbon-like body 1 (the right-hand end in the FIGS. 1 and 2) there is formed a core portion 17 which preferably has a circular-cylindrical or polygonal outer surface. After the manufacture of the ribbon-like body 1 shown in the FIGS. 1 and 2, it is rolled up so as to form a cylinder, the core portion 17 being situated in the centre of the cylinder thus formed (see FIG. 3). Rolling up is performed so that the thin strip 15 is situated at the outside of the cylinder. The oblique sides of the elements 13 are then positioned against one another and the narrow sides are situated against the outer surface of the core portion 17. In order to maintain the desired shape of the cylinder, it is mounted in a bush 19 which is made of, for example metal or plastics. The cylinder located in the bush 19 forms a very compact supporting body 21 for the contact members 3.

The ribbon-like body 1 is preferably rolledup by means of a tool which acts on the core portion 17. To this end, the core portion 17 is provided with a recess 23 having a non-circular cylindrical inner surface (in the embodiment shown, a hexagonal inner surface). A tool which is rotatable about its axis and which has a correspondingly shaped end can be inserted therein.

Figure 4:
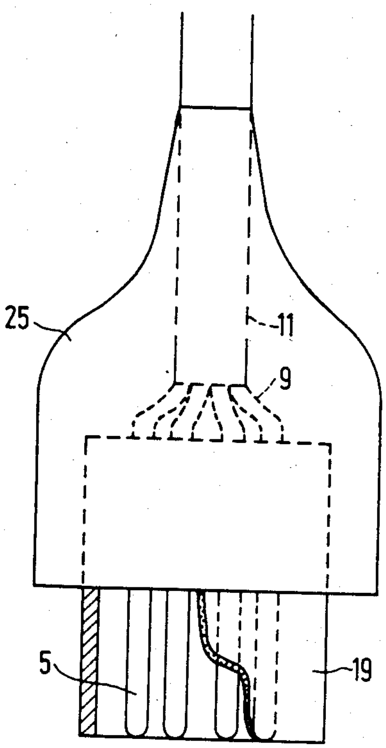
FIG. 4 is a side elevation of an embodiment of a plug manufactured by means of the method in accordance with the invention.

Subsequently, the supporting body 21 is enclosed, together with the adjoining portion of the cable 11, by a plug body 25 which leaves the contact portions 5 free (see FIG. 4). The plug body 25 can be formed, for example by injection-moulding using a suitable plastics, for example PVC. Another possibility of forming the plug body 25 is to interconnect two complementary shells, for example by ultrasonic welding. Such methods of forming plug bodies are known per se. As appears from FIG. 4, the bush 19 may be extended so as to project from the plug 25 so that it envelops the contact portions 5. This projecting portion, partly broken away in FIG. 4, can serve to guide the plug during insertion into a receptacle or coupling connector. When the bush 19 is made of metal, it can also serve as a shield. The described embodiment of the plug includes eight contact members. The same method can be used for manufacturing plugs having a smaller number of contact members (at least three) or a slightly larger number, for example nine or ten.

Figure 5:
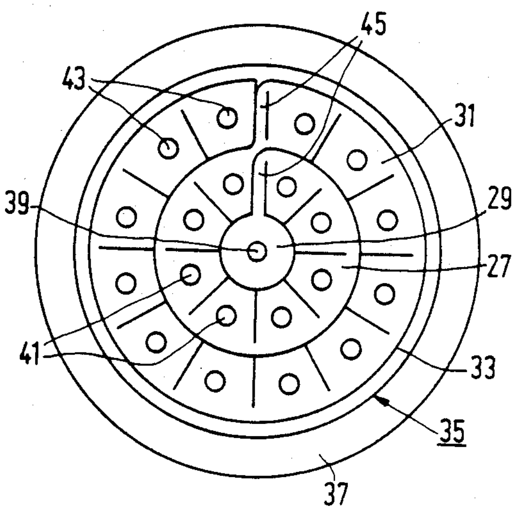
FIG. 5 is a front view of a second embodiment of a plug manufactured by means of the method in accordance with the invention.

FIG. 5 is a front view of a second embodiment of a plug manufactured by means of the method in accordance with the invention which has a substantially larger number of contact members. The ribbon-like body of the present embodiment includes a first section 27 which is rolled around the core portion 29 and a second section 31 which is rolled around the first section. The assembly thus formed is mounted in a bush 33, thus forming a supporting body 35 which is subsequently enclosed by a plug body 37 in the manner described with reference to FIG. 4. The first section 27 and the core portion 29 may be the same as the ribbon-like body 1 described with reference to the FIGS. 1 to 3. In the embodiment shown in FIG. 5, however, the core portion 29 is provided with a central contact member 39 instead of a recess; this central contact member may be the same as the other contact members 41 in the first section. During the rolling up of the ribbon-like body, a tool which is rotatable about its axis can act on the central contact member 39, if desired.

The construction of the second section 31 is analogous to that of the first section 27, be it that the second section of the present embodiment includes twelvecontact members 43 which may be the same as the eight contact members 41 of the first section. The contact members 41 and 43 are arranged in concentric circles. The total number of contact members (pin contacts or socket contacts) of the present embodiment, therefore, amounts to twenty-one. Should a substantially larger number of contact members be desired, a third and possibly further sections may be added to the ribbon-like body without objection. Between the core portion 29 and the first section 27 there are situated, like between the first section and the second section 31, portions of a thin strip of plastics 45 which also constitute the connection between the trapezoidal elements in which the contact members 41, 43 are embedded.

What is claimed is:

1. A method of manufacturing an electrical plug having at least three linear contact members arranged in a circle, a substantial portion of each contact member adjacent a first end thereof being an electrical contact and a remaining substantial portion of each contact member adjacent the opposite end thereof being a connection portion thereof which is electrically and mechanically connected to a conductor of a cable, the contact members being secured in a supporting body which is subsequently enclosed, together with the adjoining portion of the cable, by a plug body which leaves the contact portions of the contact members free; such method comprising forming said supporting body by the steps of:

aligning the contact members so as to be adjacent and mutually parallel in a straight line;

moulding the connection portions of the aligned contact members in a ribbon-like, flexible plastic body so as to embed such connection portions in such plastic body;

connecting the connection portions of the contact members to the conductors of the cable;

rolling up the plastic body so as to form a cylinder which constitutes said supporting body; and mounting such cylinder in a bush of insulating material.

2. A method as claimed in claim 1, wherein the connection portions of the contact members are connected to the conductors of the cable prior to embedding such connection portions in the ribbon-like plastic body.

3. A method as claimed in claim 1, further comprising forming the ribbon-like plastic body as a thin strip of plastic having thereon a plurality of adjacent portions of trapezoidal cross-section, and embedding the connection portions of the contact members in respective ones of such trapezoidal portions.

4. A method as claimed in claim 1, further comprising forming a core portion at one end of the ribbon-like plastic body, and rolling up the ribbon-like plastic body around such core portion.

5. A method as claimed in claim 4, characterized in that a recess having a non-circular cylindrical inner surface is formed in said core portion.

6. A method as claimed in claim 4, characterized in that said core portion is formed around a central contact member.

7. A method as claimed in claim 2, further comprising forming the ribbon-like plastic body as a thin strip of plastic having thereon a plurality of adjacent portions of trapezoidal cross-section, and embedding the connection portions of the contact members in respective ones of such trapezoidal portions.

8. A method as claimed in claim 2, further comprising forming a core portion at one end of the ribbon-like plastic body, and rolling up the ribbon-like plastic body around such plastic core portion.

9. A method as claimed in claim 8, characterized in that a recess having a non-circular cylindrical inner surface is formed in said core portion.

10. A method as claimed in claim 8, characterized in that said core portion is formed around a central contact member.

11. A method as claimed in claim 2, further comprising forming at least two sections in the ribbon-like plastic body, embedding the contact portions of the contact members in respective ones of said sections, and rolling each subsequent section around the preceding sections in order to form a plug in which the contact members are arranged in at least two concentric circles.

* * * * *